United States Patent [19]

Sundermeyer

[11] Patent Number: 4,840,328

[45] Date of Patent: Jun. 20, 1989

[54] METHOD AND ARRANGEMENT FOR THE AUTONOMOUS DETERMINATION OF AN INERTIAL POSITIONAL REFERENCE ON BOARD A GUIDED PROJECTILE

[75] Inventor: Peter Sundermeyer, Lauf, Fed. Rep. of Germany

[73] Assignee: Diehl GmbH & Co., Nuremberg, Fed. Rep. of Germany

[21] Appl. No.: 157,890

[22] Filed: Feb. 19, 1988

[30] Foreign Application Priority Data

Mar. 6, 1987 [DE] Fed. Rep. of Germany ....... 3707159

[51] Int. Cl.$^4$ .............................................. F41G 7/00
[52] U.S. Cl. ................................................. 244/3.15
[58] Field of Search .................... 244/3.15, 3.16, 3.21

[56] References Cited

U.S. PATENT DOCUMENTS

| | | | |
|---|---|---|---|
| 3,332,642 | 7/1967 | Halling | 244/3.15 |
| 3,695,555 | 10/1972 | Chadwick | 244/3.16 |
| 4,198,015 | 4/1980 | Yates et al. | 244/3.15 |
| 4,277,038 | 7/1981 | Yates et al. | 244/3.15 |
| 4,606,514 | 8/1986 | Sundermeyer | 244/3.15 |

OTHER PUBLICATIONS

Brockhaus; Rudolf; "Flugregelung I–Das Flugzeng als Regelstrecke"; 1977; pp. 64–75.

Primary Examiner—Charles T. Jordan
Attorney, Agent, or Firm—Scully, Scott, Murphy & Presser

[57] ABSTRACT

A method for the autonomous determination of an inertial positional reference on board a guided projectile through the ascertaining and evaluating of pressure values in the surroundings of the projectile during the movement thereof along a ballistic trajectory. Moreover, also disclosed is an arrangement for the autonomous determination of an inertial positional reference on board a guided projectile which is launched in a ballistic trajectory through measuring of the pressure in the surroundings about the projectile. In an aerodynamically stable condition of flight of the projectile, there is measured the dynamic atmospheric pressure of the surrounding medium onflowing relative to the projectile, and for the measured value of the atmospheric pressure as the characteristics curve parameter for the momentarily given elevator or stabilizer position of the momentarily absolute pitch position angle of the projectile, is read out from a field of characteristics curves, which as its content, provides from model observations or model investigations, the pitch position angle in dependence upon the projectile elevator position pursuant to the aerodynamic trim equations for the assumed condition of flight.

6 Claims, 2 Drawing Sheets

METHOD AND ARRANGEMENT FOR THE AUTONOMOUS DETERMINATION OF AN INERTIAL POSITIONAL REFERENCE ON BOARD A GUIDED PROJECTILE

BACKGROUND OF THE INVENTION

1. Field of the Invention

The present invention relates to a method for the autonomous determination of an inertial positional reference on board a guided projectile through the ascertaining and evaluating of pressure values in the surroundings of the projectile during the movement thereof along a ballistic trajectory. Moreover, the invention relates to an arrangement for the autonomous determination of an inertial positional reference on board a guided projectile which is launched in a ballistic trajectory through measuring of the pressure in the surroundings about the projectile.

2. Discussion of the Prior Art

Measures of the type which are under consideration herein, are essentially known from the disclosure of U.S. Pat. No. 4,606,514, which is jointly assigned to the common assignee of the present application and to the Martin-Marietta Corporation, Bethesda, Md. In that instance, the measurement of the pressure is implemented for the determination of the passage of the projectile through the apogee of the ballistic trajectory; in effect, through determining the timewise sequence of the first derivation in time of the altitude-dependent pressure detonation, which becomes zero during passing through the apogee. Inasmuch as, because of the ballistic conditions, the longitudinal axis of the projectile is oriented in a good approximation in parallel with the spatial horizontal during passage through the apogee, then through the determination of the point in time of the apogee there is determined a pitch position reference angle (namely, zero degrees) along the ballistic trajectory, which can be rendered available to the automatic pilot as an inertial reference for changing the projectile from the ballistic firing or launch trajectory into an extended target searching-gliding trajectory. Due to this autonomous on-board determination of a pitch position-reference angle, there is obviated the need, prior to the firing of the projectile from a weapon barrel or launch tube, to manually enter the starting conditions which determine the ballistic trajectory (namely, with respect to the elevation of the firing barrel or launch tube relative to the horizontal and with respect to the muzzle exit velocity dependent upon the firing charge), which especially under combat field conditions would lead to excessively error-susceptible handicaps in calculating the trajectory.

However, while the determination of the pitch position reference through the intermediary of the autonomous apogee determination on board the projectile has been ascertained is being basically operationally reliable, dependable, it is subject to the disadvantage, that the firing or launch-fixed altimeters which are necessary for the determination of the altitude zero-passage of the trajectory, are relatively imprecise. Resulting therefrom is an area of uncertainty in the timewise and positional determination of the apogee, which becomes more widespread the flatter the ballistic starting trajectory, in effect, the less distinct is the apogee of the trajectory. This uncertainty in the transmission of the information over the apogee to the automatic pilots can have the consequence in the latter, that the preprogrammed point in change for the transition from the ballistic starting flight path into the inclined gliding path can actually be only imprecisely implemented, which corresponds to an imprecision in the delivery of a projectile which is self-guiding and target-seeking during the final flight phase; in essence, adversely influences the effectiveness of the ammunition.

SUMMARY OF THE INVENTION

Accordingly, in recognition of these conditions, it is an object of the present invention to significantly improve upon the obtention of an inertial positional reference for the guidance in the transition in the path of flight from the ballistic into the inclined or sloped trajectory, in the interest of obtaining a minimal delivery error notwithstanding the obviating of, possibly manual, starting tasks, at the lowest least possible additional requirements for sensors.

This object of the invention is inventively achieved through a method as described hereinabove, in that in an aerodynamically stable condition of flight of the projectile, there is measured the dynamic atmospheric pressure of the surrounding medium onflowing relative to the projectile, and for the measured value of the atmospheric pressure as the characteristics curve parameter for the momentarily given elevator or stabilizer position of the momentarily absolute pitch position angle of the projectile, is read out from a field of characteristics curves, which as its content, provides from model observations or model investigations, the pitch position angle in dependence upon the projectile elevator or stabilizer position pursuant to the aerodynamic trim equations for the assumed condition of flight.

Moreover, the invention relates to an arrangement as described hereinabove in which there is provided a transmitter for the dynamic atmospheric pressure of the medium which is onflowing relative to the projectile, as well as a characteristics curve storage for the dependence of the positional angle upon the elevator position of the projectile flying stably in the assumed condition of flight, with the atmospheric pressure being a grouping of characteristics curves parameters, whereby the characteristics curve storage, upon actuation from the atmospheric pressure transmitter and from an elevator position indicator, transmits the actual inertial pitch-position angle to an automatic pilot.

The foregoing is predicated on the recognition that, for the obtention of a pitch position-reference angle at a practical suitable starting elevation of the ballistic trajectory, it is not necessary to obtain information with regard to the passage through the apogee when the dynamic atmospheric pressure is measured on the basis of the relative motion between the projectile and the surrounding medium and processed in conjunction with magnitudes which are already available in the automatic pilot of a self-guiding projectile; as well as being supplemented by stored data area from system investigations which describe groupings of characteristics curves, which have as a content the stable flight behavior of the projectile in dependence upon the influencing magnitudes or quantities of the known trim equations.

Hereby, inasmuch as for a given projectile speed relative to the surrounding medium, the assumed condition of flight for a certain elevator or stabilizer position, at a given point in time requires a certain pitch-position angle (and only orientations and movements in the pitch plane are hereby of interest), and since the momentary speed above the Mach number for a given medium density is proportional to the atmospheric pressure which is to be measured at the projectile, it is basically adequate to retrieve the momentary elevator position from the automatic pilot for the assumed condition of flight and to measure the atmospheric pressure. With the measured atmospheric pressure as the characteristics curve grouping parameter, there is resultingly obtained from the trim equation data areas for the given elevator position a certain actual, momentary pitch-position angle of the projectile, which can be transmitted to the automatic pilot as an inertial positional reference for the later effected change from the ballistic trajectory into the gliding trajectory.

In order to be also able to, moreover, consider the influences of disruptive magnitudes on the measured atmospheric pressure, especially such as altitude-dependent and the weather-dependent density fluctuations of the medium onflowing against the projectile, during this reading-off of the characteristics curves for determining the positional angle, it is adequate to observe the effect of a defined change in the elevator or stabilizer position on the previously assumed condition of flight, which is measurable as a system-internal positional change by means of the output signal of the autopilot pitch rotational speed gyro as a change in angular position.

This is because a change in the elevator position leads to a measurable change in position, whose amount at a given change in the elevator or stabilizer position, and with the actually measured atmospheric pressure being a parameter, allows for the obtaining of information with respect to the medium density (and thereby indirectly over the momentary altitude of flight). Since the amount of the change in the positional angle at a given change in the elevator position can be clearly associated with an actual flying altitude through the altitude-dependent medium density, from further stored characteristics curve data areas (namely, for the dependency of the positional angle upon the atmospheric pressure and from the elevator position) there can be directly read-off the absolute spatial positional angle from the characteristics curve area, when for the momentary flying altitude at a pregiven elevator or stabilizer position, there is measured the given atmospheric pressure as an input magnitude.

The invention thus facilitates the autonomous determination of the inertial pitch or longitudinal positional angle on board the projectile through an atmospheric pressure measurement and the evaluation of the change in position in dependence upon a test actuation for the temporary change in the elevator position.

This obtention of the positional angle can be further precised and accelerated, when the timewise behavior of the change in the angular position due to a change in the elevator position is compared with the transitional dynamics which is to be expected due to the system behavior for this definite positional change, inasmuch as this is also dependent upon the momentary medium density and thereby upon the altitude which is reached along the ballistic trajectory.

BRIEF DESCRIPTION OF THE DRAWINGS

Additional alternatives and further modifications, as well as further features and advantages of the invention, can now be readily ascertained from the following detailed description of an exemplary embodiment of the invention, taken in conjunction with the accompanying drawings; in which.

DETAILED DESCRIPTION

The ballistic trajectory B of a projectile 12 which is fired from a weapon barrel or launch tube 11 is essentially determined from the firing charge and firing elevation. Upon the knowledge of these starting conditions S, there can be resultingly determined the apogee location A and the point in time tA of the passage through the apogee. From the foregoing, in turn, there can be extrapolated to the changeover timepoint tU, at which there should be effected a change from the essentially ballistic flying attitude of the projectile 12 into an extended essentially more flatly sloped gliding trajectory G, from which there should be carried out the scanning of the target terrain for a target object which is finally to be attacked. For this change in the trajectories, which is automatically carried out through the program control and the regulating function of the autopilots 13 on board the projectile 12, an inertial pitch-position angular reference is required; in effect, the knowledge with respect to the pitch-position angle T which has been actually assumed by the projectile 12 in space at a certain timepoint tT along the ballistic trajectory B prior to the reaching of such changeover point U.

In order to be independent from input errors and starting or launching disturbances, pursuant to the present invention the positional angle T is not taken-off directly or indirectly from manually introduced starting conditions S (namely, from the therefrom obtained points in time tA of the passage through the apogee, in which, the longitudinal axis L of the projectile is oriented in a good approximation to a parallel with the horizontal H). In contrast with the foregoing the determination of the positional angle T of the projectile relative to the horizontal H is carried out autonomously on board the projectile 12 in a pitch-position angle detector 14.

Figure 1:
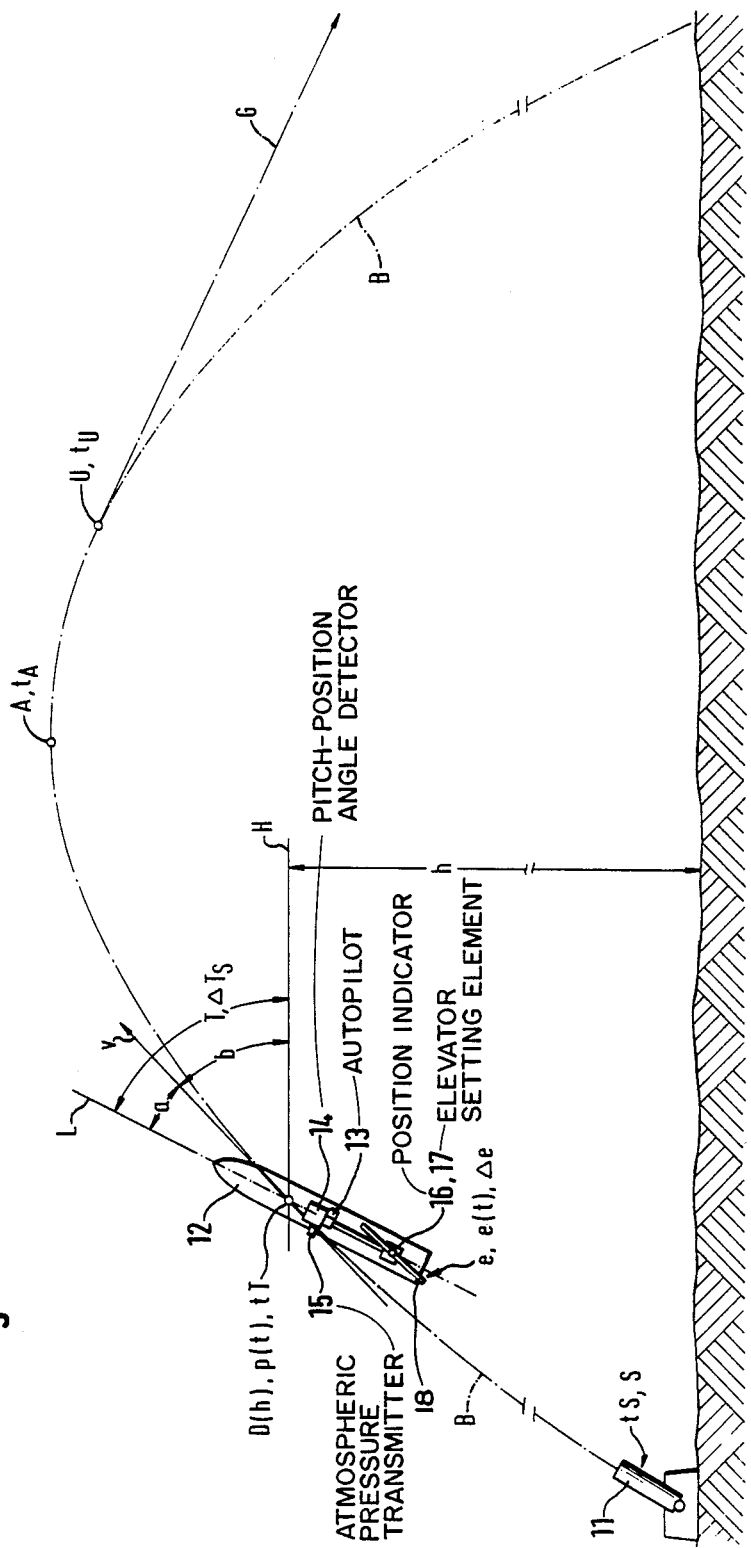
FIG. 1 illustrates a generally schematic elevational projection in the pitch plane of the transition from a ballistic gliding trajectory into an extended searching gliding trajectory, under consideration of the trim angle and axes of a guided projectile projected into this plane.

The last-mentioned essentially possesses an atmospheric pressure indicator or transmitter 15 for the momentarily present dynamic pressure of the medium onflowing against the projectile 12, and a position indicator or transmitter 16 which delivers a measured value with regard to the momentary elevator or stabilizer position e relative to the longitudinal axis L of the projectile; in effect, for example, it is directly coupled with an elevator setting element 17. In the specific representation in FIG. 1, the atmospheric pressure transmitter 15 is shown arranged directly on the fuselage of the projectile 12, sufficiently projecting therebeyond; for example, it can pivot radially outwardly from an opening relative to the longitudinal axis L of the projectile, which opening is freed through the extension of swingwing or foldable stabilizing fins (not shown in the drawing). Preferably, however, the transmitter 15 for the dynamic atmospheric pressure P is, arranged in a region of possibly undisturbed onflow, for instance, such as at the end of a stabilizing fin, as is known from the aerodynamic measuring technology. In the drawing, tail end fins are illustrated as pitch or elevator control surfaces 18; however, other types of structures, such as swing wings or canard fins can be contemplated for utilization in the invention.

It is decisive that, in accordance with the known trim equations; for example, as discussed in Rudolf Brockhaus "Flugregelung I - Das Flugzeug als Regelstrecke" Oldenbourg-Verlag, 1977, in particular, pages 64 through 75; relating to aerodynamic flight guidance (in effect, a certain time after leaving the launch tube 11), that the roll-stabilized flying projectile possesses an assumed condition of flight; meaning, that for a certain position e for the elevator, at a corresponding velocity v and a given density D of the medium required for the ascent, there has been assumed a certain constant pitch position of the projectile 12 in space. This pitch position can be described as a spatial reference orientation through the positional angle T between the longitudinal axis L of the projectile and the horizontal H, and is attained from the angle of incidence a (between the longitudinal axis L of the projectile and the velocity v) in addition to the trajectory angle b (between the velocity vector v and the horizontal H as the inertial reference). Hereby, the velocity vector v describes the actual direction of movement of the center of gravity of the projectile 12 at the momentarily reached point in the ballistic trajectory B; in essence, the momentary tangents of the movement along the trajectory B. In order to avoid any kind of errors, it must be reminded that, in connection with the foregoing, merely the pitch angle (meaning, the angle in the plane of representation of FIG. 1) needs to be considered; in essence, yaw motions of the projectile 12 for lateral guidance and types of roll motions for maneuvering are not considered.

Inasmuch as the assumed steady condition of flight pursuant to the trim equations is characterized in that no pitch moment acts on the projectile 12; in effect, the read-off of the positional angle T(t) at this time is zero, and since the dynamic atmospheric pressure p which is to be measured is proportional to the product obtained from the medium density D and the square of the relative velocity v between the medium and the projectile 12, the actual positional angle T determines itself from the actual elevator position e through the trim equation characteristics curve area with the actually measured static pressure p as the parameter. This trim equation characteristics curve area can be determined through the measuring technology during flight investigations or simulating runs for the given configuration of a projectile 12, and stored in a digitalized manner in a characteristics curve storage 19. From the foregoing, for a pregiven elevator position e, there is read-out the momentary positional angle T, which is sought as the positional reference, on that particular characteristics curve of the stored grouping of characteristics curves, which is associated with the momentarily measured atmospheric pressure p; as can be ascertained from the diagrammatic representation in the storage 19 in FIG. 2, shown with only one characteristics curve and an indication of its atmospheric pressure-dependent displacement relative to the grouping of characteristics curves.

The simple dependence of the momentary positional angle T upon the momentary elevator position e at a measured atmospheric pressure p, which has been evaluated in accordance with this basic solution, provides in actual practice, at all times due to the dependence of the media density D on altitude, under circumstances, sufficiently precise results with respect to the momentary positional angle T of interest, only when the evaluated characteristics curve grouping has been assumed within the range of altitudes in which the measurement of the atmospheric pressure actually takes place. However, even then, when the point in time for this measurement is preset in dependence upon the starting timepoint tS, and is called up on board the projectile 12 through the intermediary of a program control, there can be obtained different measuring altitudes h in dependence upon the starting conditions S; in effect, from the initial incline or elevation of the trajectory B and the initial or starting speed of the projectile 12. In order to compensate for such influences, pursuant to a further modification of the invention, it would nevertheless not be necessary to also anticipate the altitude h as an additional parameter from the characteristics curve groupings which are held in readiness in the storage 19; in effect, to implement an altitude measurement on board the projectile; in which the influence of the barometric pressure at the ground on the actual density D at the altitude h has anyway not yet been determined. Instead thereof, us may be made of the fact that, in accordance with the trim equations, in the assumed condition of flight a defined change in the elevator position e leads to a change in the positional angle T which is dependent upon the density D. For the change in the positional angle T which takes place over the period of time, there need not be carried out any absolute measurement relative to the horizontal H, it is sufficient to provide the integration over time of the output signal of a pitch rotational speed gyro which is already present on board the projectile 12 for the operation of the autopilot 13.

When the output signal Ts thereof is constant over time, then a constant-value detector 21 leads for a time interval ti to the actuation of the elevator or stabilizer control element 17 for the temporary transition into a new elevator position e. Pursuant to the relationships, which are provided through the trim equations, under the environmental conditions (velocity v and medium density D) which are resent, this leads to a certain change in the pitch position Ts, which when summed up over the applicable time interval ti, has a changed positional angle T as its result, for which there is again attained an assumed condition of flight corresponding to the new elevator position e.

Figure 2:
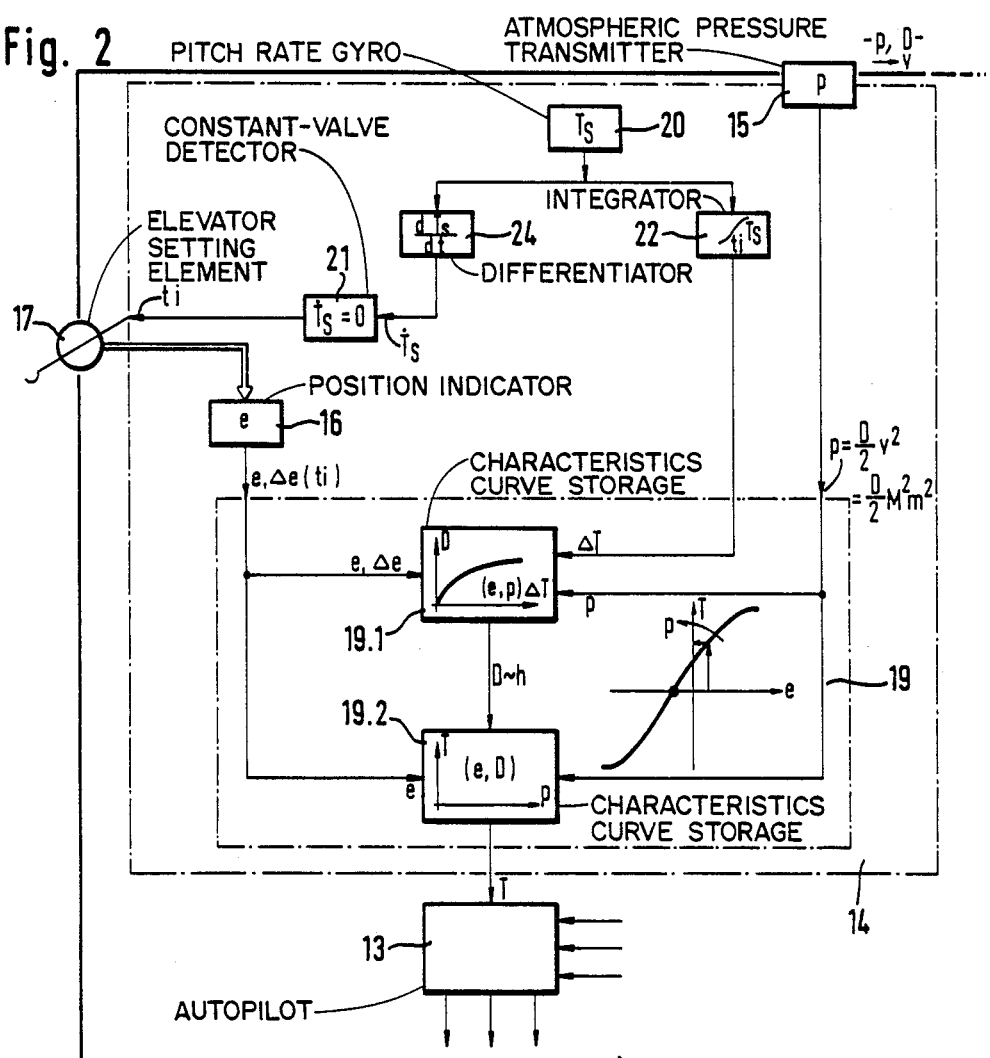
FIG. 2 illustrates a simplified block circuit diagram of the obtention of the pitch-position reference angle from the measured dynamic atmospheric pressure implemented autonomously on board the guided projectile, the interrogated elevator positional angle and the stored trim equation-characteristics curve areas for the behavior of the concretely illustrated guided projectile.

Inasmuch as at a given atmospheric pressure p, a certain change in the elevator position e in the steady assumed condition of flight has a definite change in the inertial pitch position angle T associated therewith, and inasmuch as these conditions are also experimentally determinable and can be made available as groupings of characteristics curves in a storage 19.1 on board the projectile 12, from this storage 19.1 there can be determined for the momentary flying conditions the medium density D in the surroundings of the projectile 12 (as indicated in FIG. 2).

With this actual medium density D and the angle of a momentary elevator position e as parameters, from a further characteristics curve storage 19.2, in conformance with a momentarily measured dynamic atmospheric pressure p, there is obtained the inertial pitch position angle T under consideration of the altitude and speed-dependent influences on the atmospheric pressure measurement; in effect, the spatial positional angle T independently of the explicit knowledge of the altitude (or other environmental influences, such as air moisture, which exert an influence over the trim behavior of the projectile 12 through the medium density D) at the location tT of measurement along the ballistic trajectory B.

Figure 3:
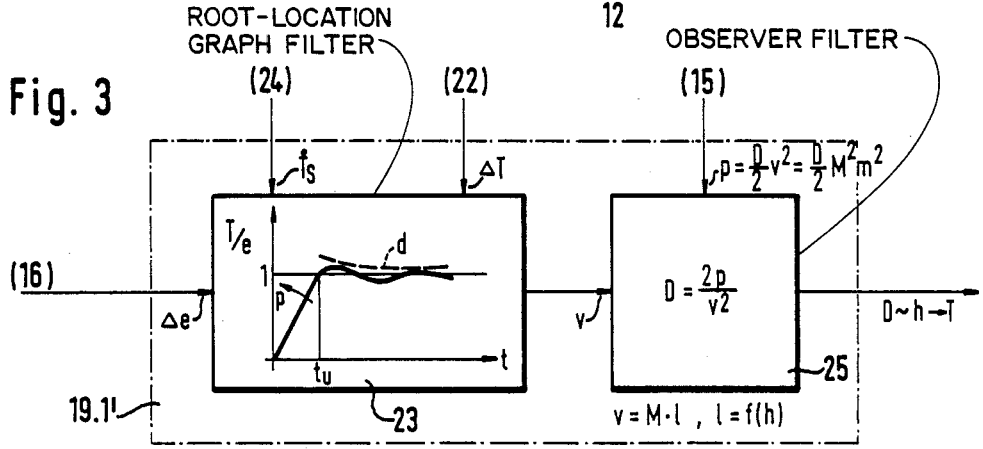
FIG. 3 illustrates, as an addition to FIG. 2, the consideration of the dynamic transitional behavior.

The procedure in determining the positional angle T from the pitch motion of the projectile 12 due to a defined change in the elevator position e can be still further precised and accelerated when, in addition to the read-out of the characteristics curves; there is evaluated the transitional behavior of the positional angle T over a period of time in dependence upon the value and upon the duration of the change in the elevator position e. This is more closely illustrated in FIG. 3. In a herein so-called root-location graph filter 23 for the fluctuations in the setting angle a due to a change in the elevator position e (viewed from the standpoint of the control technology) there is determined the position of the pole in the complex root location-counting plane in real time; meaning, the displacement of the fluctuating pole positions towards lower imaginary values at an increased magnitude of the real values are evaluated in dependence upon the increase in the mach number M and thereby the measured atmospheric pressure p. From the technological demands on circuitry, this signifies that a measurement of the environmentally-dependent ascent period tu of the positional angle T which is normalized to the elevator position e, until the first attainment of a new positional angle T finally resulting from a change delta-e in the elevator position, whereby this ascending period tu shortens itself with a rising atmospheric pressure p and thereby with an increasing speed v, in effect, an increasing mach number M. The function of such a filter 23 is also designated in the control technology as a "non-linear observer", from which conclusions can be obtained over the influencing magnitudes from the largest possible numbers of transitional criteria. Such transition criteria, besides the mentioned ascent tu, are for example, the amplitude and/or the integral of the overshooting about the steady end position, as well as the attenuating time constants indicating the damping d. From the measured behavior of the system, indicated by the value of the pitch rate which is delivered from the differentiator 24 (in effect, the ascending gradients of the pitch position Ts) and through the amount of the change in the positional angle delivered by the integrator 22 as the consequence of an adjustment of the elevator position e, evaluated in the observer-filter 23 for such characteristic magnitudes, a conclusion can be drawn with regard to the speed of flight v, which can be represented as the product from the mach number M and the speed of sound m (as a coefficient of measure for the medium density D). Since the measured atmospheric pressure p depends upon the square of the speed v, and inasmuch as the medium density D, as well as the speed of sound m in that particular medium, is dependent upon altitude, in a filter 25 which is connected to the output of the observer filter 23, for the evaluation of these exponential dependencies of the air density D which reigns at the actually reached location along the trajectory B, there can be determined the altitude of flight h at this location.

Such an evaluation of the dynamic transitional behavior or altitude by means of an observer filter 23, and the exponential and filter 25 which is connected to the output thereof, thus improves upon and accelerates the determination of the magnitude of the environmental influence which is characterized through the medium density D on the autonomous on-board determination of the momentary inertial positional angle T effected in real-time from a measurement of the atmospheric pressure p.

For simplifying the illustration, in FIG. 2 the autopilot 13 is represented as being independent of the components of the pitch-position angle detector 14. Actually, in the practical implementation of a guided projectile 12, in particular the pitch rotational rate or speed gyro 20 and the setting transmitter 16 are, as a rule, contained in the autopilot 13, inasmuch as they deliver information with respect to the guidance along the trajectory, whereas the autopilot 13 acts directly on the elevator control or setting element 17. Since the autopilot 13 is essentially supplied as a digital signal processor, therein there can also be implemented therein the functions of the differentiator 24, or respectively, the constant value detector 21 (for determining the stable flight position prior to obtention of the positional angle T), and that of the integrator 22 (for measurement of the change in the positional angle as the result of a change in the elevator setting), as well as the storage 19 for the preparation of the trim equation-characteristics curve areas obtained from experiments and simulation runs; for example, the observation filter 23 including the exponential filter 25.

What is claimed is:

1. A method for the autonomous determination of an inertial positional reference on board a guided projectile through the obtention and evaluation of pressure values in the surroundings of the projectile during the movement thereof along a ballistic trajectory; comprising measuring the dynamic atmospheric pressure of the medium of the surroundings onflowing against the projectile during an aerodynamically stable condition of flight of the projectile; and with the value of the atmospheric pressure measurement as a characteristics curve parameter for the momentarily given position of an elevator or stabilizer of the projectile, reading out the momentary absolute pitch position angle of the projectile from an area of characteristics curves, which has as the content thereof the pitch position angle in dependence upon the position of the elevator in conformance with aerodynamic trim equations for the assumed condition of flight as determined from model observations or model investigations.

2. A method as claimed in claim 1, comprising measuring the change in the positional angle on the basis of a defined change in the setting of the elevator; and obtaining with the momentarily measured dynamic atmospheric pressure of the medium of the surroundings as the parameter from a correspondingly stored characteristics curve area a flying altitude-dependent density information, which is introduced into a further pregiven characteristics curve area as a characteristics curve parameter for the reading out of the absolute pitch angle of the absolute inertial positional reference angle in dependence upon the momentarily measured dynamic atmospheric pressure.

3. A method as claimed in claim 2, comprising evaluating as a further parameter transitional behavior of the positional angle over a period of time in a comparison with the expected transitional dynamics of the system of the projectile.

4. An arrangement for the autonomous determination of an inertial positional reference on board a guided projectile which is started in a ballistic trajectory, through the measurement of pressure in the surroundings of the projectile, comprising a transmitter for the dynamic atmospheric pressure for the medium onflowing relative to the projectile; as a characteristics curve storage for the dependence of a positional angle upon an elevator or stabilizer position of the projectile which has assumed a stable condition of flight, with the atmospheric pressure being a parameter from a grouping of characteristics curves; said characteristics curve storage upon activation from said atmospheric pressure transmitter and from an elevator setting transmitter transmits the actual inertial pitch position angle to an automatic pilot.

5. An arrangement as claimed in claim 4, comprising a characteristics curve storage for he altitude dependent medium density in response to a change in the momentary positional angle based on a change in the elevator setting, with the atmospheric pressure being a parameter consisting of a grouping of characteristics curves; a further characteristics curve storage for the dependency of the absolute positional angle upon the momentary atmospheric pressure, the altitude-dependent medium density and the momentary elevator setting being characteristics curve parameters; a pitch rotational rate gyro having a constant-value detector connected to one output and an integrator to another output, the constant value detector at a steadily maintained pitch position angle initiating a defined actuation of the elevator setting element, and the integration results of the integrator being connected as independent variables to the density characteristics curve storage and the output signal of the atmospheric pressure transmitter being connected as independent variables to the positional angle characteristics curve storage.

6. An arrangement as claimed in claim 5, comprising an observer-filter for the evaluation of the timewise transitional behavior of the change in the positional angle in dependence upon a test change in the elevator setting of the projectile.

* * * * *